(12) United States Patent
Patel et al.

(10) Patent No.: US 12,515,376 B2
(45) Date of Patent: Jan. 6, 2026

(54) PREPREG TAPE SLITTING APPARATUS AND METHOD

(71) Applicant: WEB INDUSTRIES, INC., Marlborough, MA (US)

(72) Inventors: Manish Patel, Bogart, GA (US); Grand Hou, Norcross, GA (US)

(73) Assignee: WEB INDUSTRIES, INC., Marlborough, MA (US)

( * ) Notice: Subject to any disclaimer, the term of this patent is extended or adjusted under 35 U.S.C. 154(b) by 277 days.

(21) Appl. No.: 17/966,211

(22) Filed: Oct. 14, 2022

(65) Prior Publication Data

US 2023/0120788 A1  Apr. 20, 2023

Related U.S. Application Data

(60) Provisional application No. 63/256,537, filed on Oct. 16, 2021.

(51) Int. Cl.

| | | |
|---|---|---|
| *B29B 13/02* | (2006.01) | |
| *B29B 13/04* | (2006.01) | |
| *B29B 15/00* | (2006.01) | |
| *B65H 35/02* | (2006.01) | |
| *B29K 63/00* | (2006.01) | |
| *B29K 307/04* | (2006.01) | |
| *B65H 16/00* | (2006.01) | |
| *B65H 18/00* | (2006.01) | |
| *B65H 21/00* | (2006.01) | |

(52) U.S. Cl.
CPC .............. *B29B 13/02* (2013.01); *B29B 13/04* (2013.01); *B29B 15/00* (2013.01); *B65H 35/02* (2013.01); *B29K 2063/00* (2013.01); *B29K 2307/04* (2013.01); *B65H 16/00* (2013.01); *B65H 18/00* (2013.01); *B65H 21/00* (2013.01)

(58) Field of Classification Search
CPC ......... B29B 13/02; B29B 13/04; B29B 15/00; B29B 2013/027; B29B 13/023; B29B 15/125; B65H 35/02; B65H 16/00; B65H 18/00; B65H 2301/5144; B65H 2801/63; B65H 18/106; B65H 23/048
See application file for complete search history.

(56) References Cited

U.S. PATENT DOCUMENTS

| | | | | |
|---|---|---|---|---|
| 4,416,719 A | * | 11/1983 | Horiuchi | ........ B32B 27/06 156/359 |
| 9,278,509 B2 | | 3/2016 | Hou | |
| 2009/0246468 A1 | | 10/2009 | Shubiger | |
| 2013/0284845 A1 | * | 10/2013 | Hou | ........ B65H 39/16 242/416 |
| 2014/0087198 A1 | | 3/2014 | Hou et al. | |
| 2015/0292677 A1 | | 10/2015 | Curless et al. | |

(Continued)

OTHER PUBLICATIONS

International Search Report and Written Opinion for PCT/US2022/046714, the international PCT application corresponding to the instant application, Feb. 29, 2023, including the Search History.

(Continued)

*Primary Examiner* — Hai Y Zhang
(74) *Attorney, Agent, or Firm* — Hoffmann & Baron, LLP; Edward K Welch, II

(57) ABSTRACT

A method and apparatus are provided for mitigating if not eliminating voids and improving wetting of fibers in prepreg sheet materials.

24 Claims, 4 Drawing Sheets

(56) References Cited

U.S. PATENT DOCUMENTS

2015/0336369 A1    11/2015   Bae et al.
2017/0274560 A1     9/2017   Taketa et al.
2020/0247014 A1     8/2020   Arcidiacono

OTHER PUBLICATIONS

Extended European Search Report for EP 22881833.2 which is the European equivalent to the instant application, Sep. 11, 2025.

* cited by examiner

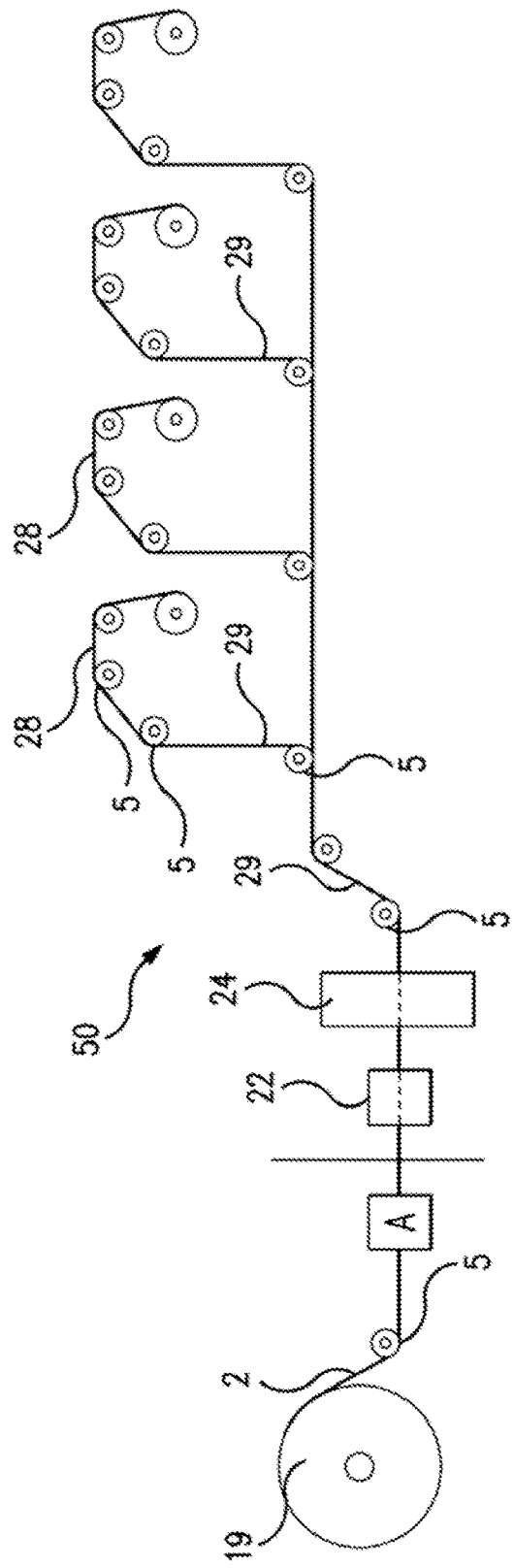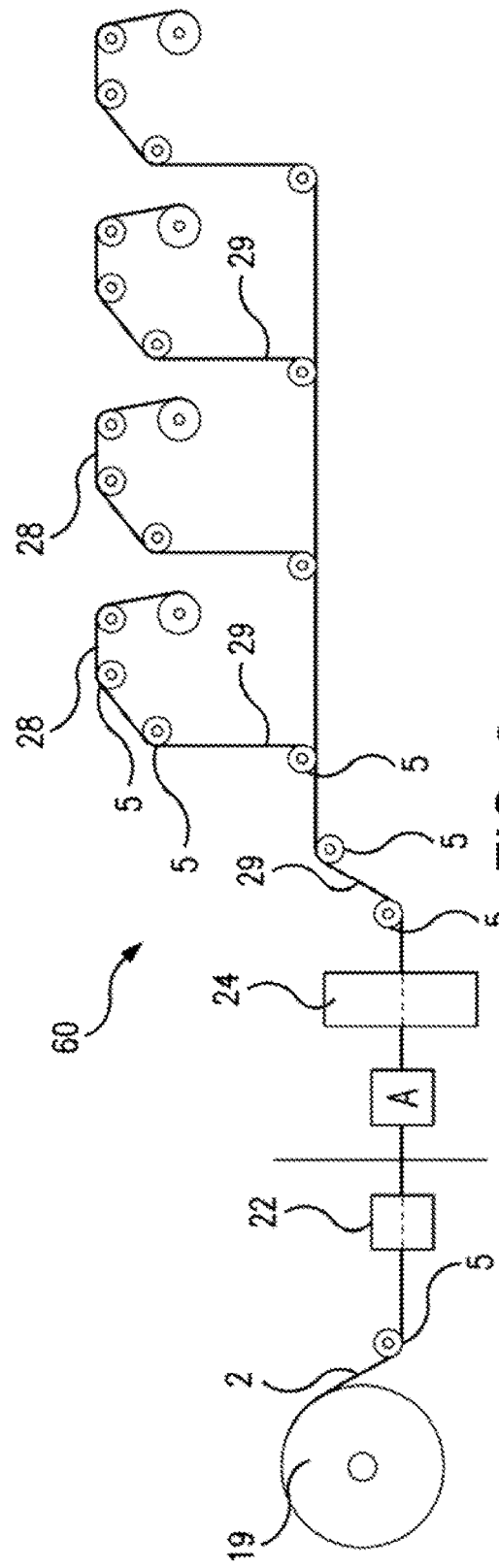

PREPREG TAPE SLITTING APPARATUS AND METHOD

RELATED APPLICATIONS

The present application claims the benefit of prior U.S. Provisional Patent Application No. 63/256,537, filed Oct. 16, 2021, entitled "Prepreg Tape Slitting Apparatus and Method." the contents of which are hereby incorporated herein by reference in their entirety.

FIELD OF THE INVENTION

The present application is directed to a method for improving the slitting of continuous sheets of thermoset prepreg composite materials to form thermoset prepreg slit tape and the apparatus therefore. Specifically, the teachings of the present application provide for the lessening, if not elimination, of voids in sheets of thermoset prepreg composite materials prior to slitting to avoid disruption in slitting processes and breaks/gaps in the slit tape.

BACKGROUND

Advances in composite technology have had a marked impact on product design and engineering and, ultimately, manufacture. Early methods involving hand lay-up of fibrous materials and sheets with the subsequent impregnation of the laid-up materials and, subsequently, the laying up of pre-impregnated fibrous sheets and mats followed by compression forming and curing saw rapid adoption and exploitation of these composite materials and technologies in many fields. However, while useful for many applications, the slow methodical build-up of the layers of materials is very labor intensive, involves the use of hazardous chemicals and, more importantly, oftentimes very unstable materials and/or materials having limited working time. Thus, while a marked advance in the industry, their applications were still limited.

Subsequent advances in composite materials and technology led to continuous manufacturing techniques. Most notably, filament winding where a continuous tow of certain fibrous materials is pulled though a bath of a curable material to impregnate the same with the curable material, wound about a mandrel to form the desired part, preferably with some measure of immediate cure to attain a green state so as to maintain its shape and fiber placement and subsequently fully cured. However, these operations were very slow and time-consuming owing to the narrow width of the tow. More importantly, these processes were very capital intensive as the whole of the operation, from preparation of the curable composition to wetting of the tow of fiber material to the formation of the part itself, all had to be performed in the same room.

Continued advances in both manufacturing and materials technology led to the ability to prepare rolls of prepreg materials, especially epoxy impregnated fibrous sheets, wherein the base sheet material was most typically formed of unidirectional, parallel fibers running the length of the roll. These rolls were typically of sufficient length, like the rolls of tow in filament winding applications, that continuous manufacturing methods could be developed. There rolls of prepreg materials are formed at the prepreg manufacturer, cooled to prevent premature curing, shipped to the site of use and warmed and subsequently used to produce the desired products. No longer was it necessary for the ultimate product manufacturer to invest capital and overhead or employee technical personnel to make the prepreg materials. Cost advantages and a focus on centered expertise (e.g., prepreg manufactures concentrated on the chemistry and manufacture of the prepreg and the product manufacturers concentrated on the layup process) proved beneficial all around.

Early on, prepreg strips or sheet materials were manufactured in standard widths that were used to make the commercial products. This was acceptable in the early going as many applications had very similar demands and requirements, e.g., baseball bats, golf clubs, hockey sticks, lacrosse sticks and the like can all be made with generally the same width of slit tape, largely because the demands are similar and the need for differentiation less. Even if not optimal, these stock tapes were used nonetheless due to the fact that making many different widths, especially making custom widths, was cost prohibitive. The capital requirements are quite large and incapable of supporting a large differentiation of products. Consequently, the full adoption of this technology in higher demanding applications was limited if the width of the tapes needed were inconsistent with the widths that were available.

More recently, technology has evolved and new expertise and processing capabilities have been developed whereby a broad array of tape widths were made possible through the slitting of stock master rolls. Wide tapes could now be made for applications having large planar or curved planar surfaces while narrow width tapes could be made for more intricate or curved parts. Though this technology allowed for the use of prepreg tapes in the manufacture of many different products whose demands, especially physical demands, required specific properties which are affected by, in part, the width of the prepreg tape, the expansion of the use of prepreg tapes into the production of aircraft parts has been one of the, if not the, major driver for recent technology innovation and advancement. While one might think that the demands for aircraft production would be fairly constant across the field of aircraft components, nothing could be further from reality. Each component must endure its own, most often unique, environment and its respective physical demands and stresses. For example, a tail fin will have marked different requirements than a wing or a fuselage portion. Combined with the tight tolerances of aircraft parts, it has become more and more apparent that a plethora of widths of slit tape are needed with differences in width for slit tape from one application to the another being on the order of just fractions of an inch, and minor fractions at that. Indeed, widths of two inches, one inch, a half inch, a quarter inch and an eight inch are quite common. More critically, width tolerances are orders of magnitude smaller, with tolerance requirements being on the order of thousandths of an inch.

Although technology has advanced to allow for rapid large-scale production of slit tapes, the process is not without its problems. While many issues and potential issues arise in the slitting and winding process itself, others originate in the master sheet materials and their manufacture. The latter issues include those relating to physical properties, especially viscosity and creep issues with the matrix resin, which adversely affect slit tape width tolerances, as well as inconsistency in the manufacture of master rolls of the prepreg materials, more specifically the presence of voids and/or unwetted fiber tows. Certainly, larger voids can oftentimes be caught by slitter operators as the slitting process proceeds so that the slitting can be stopped and the void section excised before it enters the slitter or immediately following slitting, prior to winding; however, most voids go undetected only to appear downstream of the slitter or in subsequent processing and/or applications, depending upon the nature of the slitting process and the extent of the void. Depending upon the size of the void and the width of the slit tape being produced, there may be a complete lack of resin across the full width of the slit tape or only a portion of the width and/or thickness. Either way, the void creates an opportunity for an outright break in the tow or a weak spot or defect that may manifest in subsequent processing and/or layup as well as other issues as highlighted below.

There are a number of commercial slitting processes, each of which suffers in the event of voids in the prepreg master sheet material. The prepreg master sheet material may be slit with the original liner or carrier sheet, typically paper, attached; with a replacement polymer film applied as the liner or carrier; or without any liner or carrier. In each of these processes, when voids are present, there are unwetted fibers which, upon engaging the slitters become frayed, fibrillated and/or cut through as there is no resin to prevent their movement or deflection relative to one another as they pass through the slitters or to bind in place any fibrils, frayed or cut fibers. These cuts into or through the fibers create weak spots in the tow which may cause a break in the slit tape as it proceeds to the winding spools/spindles, causing a shutdown of the whole of the process while the tape is spliced. Alternatively, these weak spots may not manifest until the slit tapes are employed in a layup process where a break results in a shutdown of the production process for the article being manufactured. The latter is particularly of concern for those slit tapes which are cut with the liner or carrier attached since the liner or carrier provides additional integrity and strength to the slit tape, which is lost once the two are separated from each other during layup.

While such breaks are damaging and frustrating, weakness is not the only problem with fraying, fibrillation and/or cut ends. Because the affected fibers and fibrils are not impregnated in the matrix resin, they are free to move and/or bend in any direction so that they are no longer parallel with and/or co-planar with the tow fibers themselves or even along the same longitudinal axis of the fiber tow of which they form a part. Consequently, these frays and fibrils become embedded in or adhered to the matrix resin of subsequent winding layers as the slit tape is wound on the final spool and/or spindle. Such an event may be disastrous for that given spool or spindle as windings may become bonded to one another so that the slit tape does not unwind, or, if it does, causes tears and/or defects in the slit tape as it unwinds. Additionally, these fibrils or frayed material may completely dissociate from the fiber tow and become lodged on other slit tape tows and/or the slitting and winding equipment, which subsequently transfers to the slit tapes, creating FOD, which again can lead to the rejection of the slit tape materials.

Thus, there remains a need in the industry for improved master rolls of prepreg sheet material which are free of, or substantially free of, voids or, if such voids persist, are smaller, preferably microscopic, so as not to affect slit tape production and use.

In following, there remains a need in the industry for a method and apparatus for the production of master rolls of prepreg sheet material which are free of, or substantially free of, voids, or if such voids persist, are smaller, preferably microscopic, so as not to affect slit tape production and use.

Additionally, there remains a need in the industry for a method and apparatus for the post-production processing of master rolls of prepreg sheet material which process reduces, if not eliminates, voids in the prepreg master sheet material, or if such voids persist, are smaller, preferably microscopic, so as not to affect slit tape production and use.

There remains a need in the industry for a production method for slit tape which method reduces, if not eliminates, the presence of voids in a prepreg master sheet material prior to slitting.

Finally, there remains a need in the industry for an apparatus for reducing, if not eliminating, voids in prepreg master sheet materials.

SUMMARY

According to the present teachings there is provided a method for reducing, if not eliminating, the presence of voids and/or unwetted fiber tows in prepreg sheet materials, especially continuous prepreg sheet materials, intended for the production of slit tape and/or for use in layup processes where the prepreg sheet material is slit at the time of application. Specifically, there is provided a method whereby a prepreg sheet material, which may be the master sheet material directly from the manufacturer or a wide strip of prepreg sheet material which has been slit from a master sheet material, is subjected to localized heating, generally the heating of a cross-sectional length of the prepreg sheet material, to a temperature at which the matrix resin i) becomes tacky and is subject to plastic deformation under minimal pressure or force or ii) becomes flowable and the temperature maintained for a sufficient period of time, generally a very short period of time, to allow the resin spread or flow, respectively, to fill the voids and/or wet the unwetted fibers before allowing the same to cool or being subjected to forced cooling. While the process is applicable to cut prepreg sheet, i.e., prepreg sheets of defined or stock lengths for a given application, it is especially beneficial for use with continuous prepreg sheet materials. In the former, the prepreg sheets of defined or stock length are stationary and the apparatus for performing the void mitigation/elimination process advanced along the length of the sheet or the prepreg sheets may be advanced through or past the void mitigation/elimination apparatus which is stationary. Alternatively, the prepreg sheets of defined length may be carried upon an appropriate conveyor and continuously advanced through or past the void mitigation/elimination apparatus. In the latter, the prepreg sheet material is continuously advanced through or past the void mitigation/elimination apparatus via a conveyor means which may be a conveyor belt, a plurality or series of rollers a plurality or series of bar elements or a combination of any two of all three.

The aforementioned method may be incorporated into the OEM production process of the master sheet material, following initial cooling, but prior to winding, or it may be performed in a post-production step where the master sheet material or stock widths of master sheet material is unwound and advanced through or past the void mitigation/elimination apparatus before being rewound. Alternatively, the method may be applied to master sheet material or stock widths of master sheet material as part of a slitting process following unwinding but prior to being slit. Here the process may be integrated into a layup process where the prepreg sheet material is slit, in line, just prior to application. Most preferably, the process is integrated into a process for the production of slit tape where the void mitigation and/or elimination process is applied to the advancing prepreg sheet following its unwinding from master rolls and prior to being slit.

Each of the aforementioned processes is an improvement over the same process in the absence of the void mitigation/ elimination process of the present teaching and constitutes a new process. In following, the product of each process is also an improvement over the product of those processes in the absence of the void mitigation/elimination process of the present teaching and also constitutes a new article of manufacture.

The process of the present teaching is achieved by the use of a void mitigation/elimination apparatus comprising a heating element capable of simultaneously heating a cross-section of the prepreg sheet material of a minimal or small defined length. Generally, the heating element will not directly impact a length of more than two feet, preferably not more than one foot, more preferably not more one-half foot: the actual length being a matter of the nature/type of heating element and the speed by which the sheet material passes the heating element. Optionally, the apparatus may include an element which applies a small pressure or force to the prepreg sheet material across its width concurrent with or immediately following the heating thereof and/or a cooling element which forces the cool-down of the heated prepreg material: preferably, the pressure/force and/or cooling being applied simultaneously across the width of the prepreg sheet material.

The void mitigation/elimination apparatus may be incorporated into the production line/apparatus for the OEM production of prepreg sheet materials at a point following its initial cool down and before its winding. If such production process also slits the prepreg sheet into stock widths, the apparatus may be incorporated prior to the slitting or after slitting, but prior to the winding: preferably the former from a capital and footprint standpoint. Alternatively, the apparatus may be integrated into a dedicated wind/unwind apparatus intermediate the feed roll and the take-up roll or into a multi-purpose unwind/wind apparatus where another function or process is applied to the unwound sheet material, e.g., an apparatus where the original backing or carrier material is replaced with a polymer liner or carrier. Finally, it may be integrated into an apparatus for the production of slit tape where the void mitigation/elimination apparatus is inserted intermediate the unwind station and the slitting station. In the case of such apparatus including a splicing station, the void mitigation/elimination apparatus may be integrated either prior to or after the splicing station. Preferably, it is integrated prior to as it eliminates voids and poor wetting that may interfere with or result in lesser quality splice and may increase the tackiness of the resin to speed up splicing.

Each of these larger apparatuses incorporating the void mitigation/-elimination apparatus presents an improved version of such apparatus as well as a new apparatus in their own respect.

BRIEF DESCRIPTION OF THE DRAWINGS

The accompanying drawings, which form a part of this specification, are to be viewed in conjunction herewith. Like reference numerals are employed to indicate like parts in the various views.

FIG. 5 is a schematic presentation of a prepreg slitting apparatus incorporating the method and apparatus of the present disclosure.

FIG. 6 is a schematic presentation of an alternate embodiment of the apparatus of FIG. 5.

DETAILED DESCRIPTION

Figure 1:
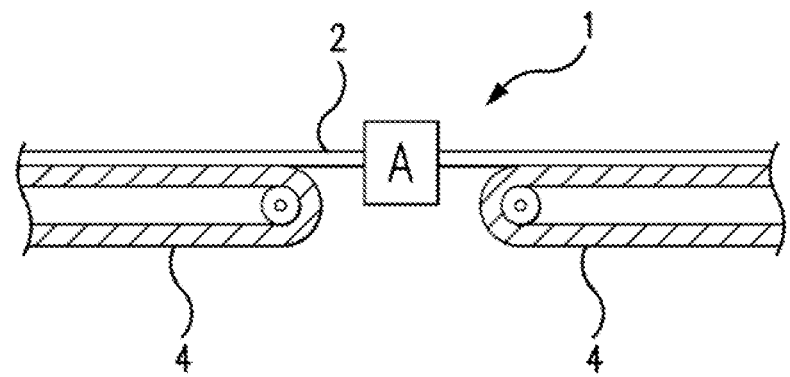
FIG. 1 is a schematic view of a portion of a prepreg manufacturing process integrating the method and apparatus of the present disclosure.

As used herein, the term "continuous" when used in reference to the prepreg sheet material means the continuous sheet as produced n the OEM manufacture of prepreg sheet materials as well as those lengthy segments thereof that are wound and cut from the same. With respect to the latter, such lengthy segments are fairly standard in the industry and supplied in master roll form. Typically, these will have lengths of at least about 25 meters up to about 1500 meters or more.

The characterization of the process as "eliminating or mitigating voids and/or unwetted fibers" and the like as well as the phrase "free or substantially free" means that the number and/or size of the voids and/or degree of unwetted fiber tows in the prepreg sheet material subjected to the claimed process is reduced by at least 50%, preferably at least 70%, more preferably at least 80%, most preferably at least 90%, in volume and/or occurrence. Ideally, the master sheet material is free of voids and/or unwetted fiber tows, at least on a macroscopic level.

The characterization of the matrix resin being elevated to a temperature at which it becomes "subject to plastic deformation" means that a minimal pressure or force, generally less than 2 psi, applied to the surface of the prepreg sheet material is able to move or cause a flow of the resin to fill the voids and/or wet the fibers: provided that the pressure or force is insufficient to induce a notable thinning, particularly a measurable thinning, of the prepreg sheet material. Preferably, plastic deformation is accompanied by enhanced tackiness so that the wetting of the fibers is better achieved.

Similarly, the characterization of the matrix resin being elevated to a temperature at which it is "flowable" or "begins to flow" means that the matrix resin has softened sufficiently to the point where it is able to flow to fill voids and wet the fibers. Depending upon the actual temperature and resin, such flow may occur on its own or it may require the addition of pressure or force to promote or expedite the flow.

Further, for avoidance of confusion, due to Applicant's word choices, it is to be understood that the phrase "may be" when referencing the steps of the claimed process means "is" or "can be": the latter especially relevant where alternatives are being considered, e.g., can be this er can be that. Where a step is optional, it will be specifically called out as such.

Prepreg sheet materials and their methods of production are well known. Generally speaking, they comprise a matrix resin, specifically a thermosetting matrix resin, which has been infused, impregnated, or otherwise integrated into a fibrous material, which may be strands or tows of fibers or fibrous materials, e.g., fiber bundles, as well as woven and non-woven fibrous materials, fabrics or mats. Exemplary matrix resins include, but are not limited to, epoxies, cyanate esters, bismaleimides, phenolics, polyimides, and the like. Though fibers of many materials may be employed, including thermoplastic polymer fibers, the preferred fibers are glass and carbon, most especially carbon. For convenience and from a preferred embodiment standpoint, the present teaching is described with a specific emphasis on prepreg sheet materials comprising the matrix resin and a plurality of parallel fibers/fiber tows aligned along the length or longitudinal axis of the sheet material wherein the matrix resin is an epoxy resin and the fibers are carbon fibers. In these embodiments, the fibers or fiber tows may be present in a single plane, in a plurality of co-planar planes, in an ordered arrangement or randomly arranged.

Depending upon the viscosity of the matrix resin and the nature of the fibers or fiber tows, e.g., individual fibers, fiber bundles, intertwined fibers, etc., as well as the arrangement and density thereof, it is difficult to ensure complete impregnation, infusion or integration of the matrix resin in and through the fibers to avoid air pockets and/or unwetted fibers and fiber bundles as well as to avoid air pockets in the matrix portion of the prepreg sheet materials. As noted in the background above, these unwetted fibers and tows as well as air pockets or voids are problematic for many end-use applications.

According to the present teachings there is provided a method for reducing, if not eliminating, the presence of voids and/or unwetted fiber tows in prepreg sheet materials, especially continuous prepreg sheet materials intended for the production of slit tape and/or for use in layup processes where the prepreg sheet material is slit at the time of application. Specifically, there is provided a method whereby a prepreg sheet material, which may be the master sheet material directly from the manufacturer or a wide strip of prepreg sheet material which has been slit from a master sheet material, is a) subjected to localized heating, generally the heating of a cross-sectional length of the prepreg sheet material, to a temperature at which the matrix resin i) is subject to plastic deformation under minimal pressure or force, preferably without increased tackiness, or ii) becomes flowable and b) the temperature maintained for a sufficient period of time, generally a very short period of time, to allow the resin to spread or flow, respectively, to fill the voids and/or wet the unwetted fibers before c) allowing the same to cool or being subjected to forced cooling. Optionally, though preferably, when the temperature of the sheet material is only elevated to the plastic deformation temperature, a minimal force or pressure is typically applied to the sheet material concurrent with the heating or immediately following the heating to encourage and/or promote plastic deformation and/or flow. Of course, pressure may also, optionally, be applied in the instance where the matrix resin is heated to the point where it becomes flowable in order to enhance and/or expedite flow and spread, especially to help minimize the time for which the resin is subjected to such higher temperatures so as to avoid premature curing/cross-linking. For convenience, rather than repeat the description of these steps over and over, this process, with or without its optional steps or elements, is herein referred to as the "void mitigation/elimination process." Similarly, the phrases "void mitigation/elimination component" and "void mitigation/elimination apparatus" refers to those components/apparatus necessary to affect the desired void mitigation/elimination and/or improved wetting of the fibers. While the void mitigation/elimination process is applicable to cut prepreg sheet, i.e., prepreg sheets of defined or stock lengths, i.e. less than 25 meters in length, it is especially beneficial for use with continuous prepreg sheet materials. In the former, the void mitigation/elimination process may be employed with either the prepreg sheets of defined or stock length being stationary and the apparatus for performing the void mitigation/elimination process advanced along the length of the sheet or with the prepreg sheets being advanced through or past a void mitigation/elimination apparatus, defined below, which is stationary. In the case of continuous prepreg sheet materials, the prepreg sheet material is continuously advanced through or past the void mitigation/elimination apparatus.

The most critical step of the void mitigation/elimination process is the heating of the prepreg sheet materials. As noted, a cross-sectional length of the prepreg sheet material is heated to a temperature at which the matrix resin i) is subject to plastic deformation under minimal pressure or force, preferably without increased tackiness, or ii) becomes flowable. The specific temperature will depend upon the composition of the matrix resin, especially the specific thermoset polymer composition comprising the matrix resin, most especially the initiator, activator or like components that are extremely heat sensitive, as well as other additives which may affect/be affected by these temperatures. The degree of plastic deformation and/or flow necessary again depends in part upon the matrix resin and its deformability/flow properties as well as whether additional forces or pressure is to be applied to the heated prepreg sheet material. Generally, the aforementioned temperature targets are the minimal temperatures to be attained in the heating step and higher temperatures are certainly allowed; however, it is best not to exceed these temperatures to any significant extent, particularly not to the point where it may trigger any cure initiators, activators, catalysts and/or accelerators present in the matrix resin. In this respect, while some minor triggering may occur, the degree of triggering or activation is minimal and will not adversely increase the matrix viscosity. Most preferably, the elevated temperature should be at least 2.5° C., preferably at least 5.0° C. more preferably at least 7.5° C., most preferably at least 10° C. below the standard trigger or activation temperature of the initiators, activators, catalysts and/or accelerators present in the matrix resin. Again, depending upon the matrix resin and its cure temperature, the prepreg material will generally be heated to a temperature of from ambient temperature to 75° C., preferably from 26° C. to 75° C. Heating of the prepreg sheet materials may be achieve through radiant heating or conductive heating including by use of electric heaters, high intensity lights, infrared heaters, ultrasonic anvils or fixtures, heated rollers, and the like.

Optionally, a force or pressure is exerted upon the heated prepreg sheet material to assist or promote the deformation and/or flow of the matrix resin. This force or pressure may be applied concurrent with the heating or immediately following heating while the matrix resin is still in a plastic deformation or flowable state. The force or pressure is to be applied across the full width of the prepreg sheet material and of minimal degree so as to assist with the deformation and flow, but not to the extent that it causes a notable thinning of the sheet material or expulsion of resin beyond the edges of the carrier sheet or liner, if present. Generally, the pressure should be no more than 2 psi, preferably no more than 1 psi, most preferably no more than 0.5 psi.

The final step of the void mitigation/elimination process is the cooling step. This may simply be established by providing a sufficient distance between the heating source and the subsequent processing step to allow the resin to cool under ambient conditions. Most preferably, the prepreg sheet material is subjected to a forced cooling in order to expedite cooling and stop or retard any activation of the cure initiators, activators, catalysts and/or accelerators that may have occurred. The extent of the cooling depends upon the desired end-temperature and the fate of the prepreg sheet material, Typically, it may be sufficient to cool the prepreg sheet material to room temperature; however, one may desire to further cool the prepreg sheet material or allow it to drop to a lower temperature. Similarly, one may desire to cool it to a temperature above room temperature so long as that temperature is not sufficient to adversely increase the viscosity of the matrix resin or affect any cure of the matrix resin. In any event, the final temperature should not be so low or so high as to adversely affect the subsequent processing step. For example, if the prepreg sheet material is simply to be wound or rewound for storage, then room temperature or near room temperature is satisfactory. However, a lower temperature may be desirable in this instance so that the core of the winding is already cool before the spool or spindle is refrigerated for storage. On the other hand, a temperature slightly elevated above room temperature is desirable where the prepreg sheet material is to be slit before winding or rewinding as it makes slitting easier; provided, that it is below the tack temperature of the matrix resin so that the resin does not stick to the cutting blades or any other components of the slitting and winding process. In this regard, depending upon the matrix resin and the temperature to which it is raise, it may be desirable to slit the prepreg material before cooling. Regardless, cooling may be achieved by any of the known methods including, conductive cooling or radiant cooling, e.g., cool/cold rollers, guides or other like elements; cool air, including forced cool air, etc.

The void mitigation/elimination process may be incorporated into the OEM production process for the production of the master sheet material, following its initial cooling, but prior to winding, or it may be performed in a post-production step where the master sheet material or stock widths of master sheet material is unwound and advanced through or past the void mitigation/elimination apparatus before being rewound. Alternatively, the method may be applied to master sheet material or stock widths of master sheet material as part of a slitting process following unwinding but prior to being slit. Here the process may be integrated into a layup process where the prepreg sheet material is slit, in line, just prior to application. Most preferably, the process is integrated into a process for the production of slit tape where the void mitigation and/or elimination process is applied to the advancing prepreg sheet following its unwinding from master rolls and prior to being slit and rewound.

Each of the aforementioned processes is an improvement over the same process in the absence of the void mitigation/elimination process of the present teaching and constitutes a new process. In following, according to one embodiment of the present teachings there is provided a method for the production of master rolls of prepreg material which are free or substantially free of voids and/or unwetted tow wherein the newly manufactured prepreg sheet material is subjected to the void mitigation/elimination process as it exits the production station and has cooled below the activation temperature of the matrix compositions, preferably at least 2° C., more preferably least 5° C., most preferably at least 10° C., below the activation temperature, before being wound or passed on to subsequent processing, if the OEM prepreg sheet material is to be slit into stock widths, e.g., widths of 10 inches or more, typically one to three feet or more (stock rolls), prior to winding, then the void mitigation/elimination process may be applied either subsequent to or, preferably, prior to slitting. This also holds true for thinner stock widths; however, in these instances, it is preferable, unless multiple strips are treated simultaneously, to perform the void mitigation/elimination process prior to slitting due to capital costs.

According to a second embodiment of the present teachings there is provided a method for rendering master rolls and stock rolls of prepreg sheet material free or substantially free of voids and/or unwetted tow wherein the method comprises continuously unwinding prepreg sheet from the master rolls or stock rolls and subjecting the prepreg sheet material to the void mitigation/elimination process before rewinding the treated prepreg sheet material.

Finally, according to a third embodiment of the present teachings there is provided a method for the production of continuous slit tapes of prepreg material which are free or substantially free of voids and/or unwetted tow wherein the master rolls or stock rolls of prepreg material is subjected to the void mitigation/elimination process before being slit. This latter embodiment may be integrated into a layup process where the master roll or stock roll of prepreg material is slit at or near the point of application in the production of a part or other article of manufacture. Preferably, though, it is employed in a slitting process where the slit tape is wound for storage and subsequent use.

Although the master rolls and stock rolls of prepreg sheet materials as well as the spools and spindles of slit tape resulting from the aforementioned processes are chemically the same as those which have not been subjected to the void mitigation/elimination process, they are unique, new, and improved inasmuch as they possess a marked reduction in voids and/or unwetted fibers or tows. Additionally, with respect to the spools and spindles of slit tapes, they have less imperfections and FODs owing to the lessening, if not elimination, of fibrillation, splaying and cut ends associated with unwetted fibers and tows.

The process of the present teaching is achieved by the use of a void mitigation/elimination apparatus comprising a heating element capable of heating, preferably, simultaneously heating, a cross-section of the prepreg sheet material, preferably one of a minimal or small defined length. Generally, the heating element will not directly impact a length of more than two feet, preferably not more than one foot, more preferably not more one-half foot at one time: the actual length being a matter of the heating element and the speed by which the sheet material passes the heating element. Optionally, the apparatus may include an element which applies a small pressure or force to the prepreg sheet material across its width concurrent with or immediately following the heating thereof and/or a cooling element which forces the cool-down of the heated prepreg material: preferably, the pressure/force and/or cooling being applied simultaneously across the width of the prepreg sheet material.

The critical component of the void mitigation/elimination apparatus is the heat source or heating element. The heat source or heating element may be a stand-alone heating fixture or element or comprise a plurality of stand-alone heating fixtures or elements which pass over the prepreg sheet material (especially in the case of cut stock sheets of prepreg material) or through or past which the prepreg sheet material is advanced, preferably on a continuous basis. Alternatively, and, depending upon the type or nature of the heating source or element, preferably, the heat source or heating element comprises one or more heating fixture(s) and/or element(s) incorporated into a chamber, e.g., an oven, or into a hood or like structure through which or past which the prepreg sheet material passes. Most preferably the heat source or heating element is one that is capable of heating the prepreg sheet material across its full width simultaneously: though it is possible that the heating fixture(s) or element(s) may traverse across the width of the prepreg sheet material. Exemplary heating fixtures or elements include radiant heat sources such as high intensity lights, infrared heaters, electric heaters, forced hot air heaters, and the like; and conductive heaters such as heated rollers, ultrasonic anvils or fixtures, and the like.

Preferably, particularly where the heat source or element generates radiant heat, the heat source or element is incorporated into or forms a part of an oven, chamber or hood whereby the heat is directed to, and preferably confined to, a defined length of a cross-section of the sheet material. For example, the sheet material may pass through an oven or oven-like chamber whose interior is heated to the temperature necessary to achieve plastic deformation or flow in the matrix resin: here, the heating source is enclosed and has two openings sized to allow the sheet material to pass through. Alternatively, the heat source may be incorporated into of have components or elements that create a hood-like structure which overlays that surface(s) of the sheet material to be heated. Additionally, and/or alternatively, the heat source may be incorporated into or have associated therewith elements, e.g., baffles, orifice or openings, that focus and/or more specifically define the shape of the radiant heat as it is directed to the sheet material. In following, a forced hot air heating source may be used which effectively creates a curtain of hot air that stretches the width of the sheet material and is expressed onto the surface(s) of the sheet material. The curtain of hot air is shaped or its width and length controlled by baffles on the hot air source. Most preferably, in this instance, the hot air curtain would be associated with a housing or chamber which captures and recirculates the hot air while simultaneously passing it by or through a heating element to heat and/or maintain the temperature of the hot air. In any event, where a radiant heat source is employed, it is preferred to have it sufficiently removed from the prepreg sheet material to better control the heating and avoid overheating or burning the prepreg. Typically, the heat source, especially the radiant heat source, is at least 2 inches from, preferably 3 to 6 inches from the prepreg surface.

The duration of the heating depends upon a plurality of factors including the matrix resin and its deformation/melt temperature, the speed of the sheet material, the size or nature of the heat source, the efficiency of the heat source in transferring heat to the resin, etc. Again, as noted above, the objective is to achieve a temperature at which the resin is capable of deformation and/or flow, in as brief a period of time as possible, hence a short residence time in the heating zone, so as to avoid any activation or substantial activation. Indeed, even when flow temperatures are to be achieved, given that the voids are small to begin with, heat exposure is only required for a brief period of time, seconds, not minutes, if that. In particular, given the reactivity of the matrix resin, it is best to limit the exposure time of the sheet material to the heat: hence, a concentrated, contained heat is preferred. Generally speaking, the exposure time or residence time in the heating section can be calculated for the most part and fine-tuned by simple trial and error. For most applications, the duration of the heating, i.e., the period of time it is exposed to the heat source, should be from about 1 second to about 10 seconds or so, preferably less. Of course, duration is also a matter of line speed. In this regard, typical line speeds for the advancing prepreg materials are from 5 feet per minute to 150 feet per minute and the duration of direct exposure to the heating element must be adjusted accordingly. Such adjustments may be achieved by using heat source that directly impacts a longer section of the sheet material and/or by adjusting the intensity of the heating element.

Optionally, the apparatus may incorporate any suitable component or means to apply a force or pressure to the heated prepreg sheet material while the matrix resin is still in its plastic deformable or flowing state. The force or pressure may be applied directly to the sheet material or by deflection: the latter arising from a change in the plane of the sheet material as it advances, i.e., there are one or more directional changes in the path of the advancing sheet material. In the case where pressure is applied directly to the sheet material, the pressure is applied by one or more rollers, blades or like elements that presses upon one or both surfaces of the prepreg sheet material. When a single element is present, the sheet material is typically on a moving conveyor or passes over a stationary platform or stage with the roller, blade or other like element on the opposing surface of the sheet material. Alternatively, a pair of rollers, blades, or like elements are positioned opposite one another with the sheet intermediate the two. In each of these instances, it is preferred that the rollers, blades or like elements be incorporated into a motorized staging or superstructure such that the elements may be backed away from the surface of the sheet materials, Optionally, though preferably, the motorized staging may be integrated with an electric eye or like measuring device which detects changes in the thickness of the sheet material so that these pressure elements can move away or towards each other depending upon changes in the thickness of the sheet material. This is particularly beneficial to accommodate splices in the sheet material which may increase the thickness up to twice the general thickness of the sheet material. Alternatively, the pressure elements may have or be associated with a biasing element or means which biases the pressure element(s) against the surface(s) of the sheet material, suitable biasing elements include springs, counterweights, pneumatic devices and the like.

As noted, pressure or force may also be applied by deflection in the path of the sheet material whereby the sheet material travels a serpentine as it advances. The deflection is achieved by placement of one or more, preferably two or more, sheet guides (e.g., a blade, cross-bar or the like), rollers or the like which redirect the path of the sheet material to force one or more bends in the sheet material as it passes the guide, roller, or like element. Preferably, this pressure component comprises a pair of rollers or guides, one of which is positioned coplanar with the sheet material as it passes through or past the heating apparatus and one of which is staggered relative to the first such that the sheet material must bend to reach and pass the second of the rollers or guides. In essence, the bend combined with the tension in the sheet materials imposes a pressure or force on the sheet material. Having a plurality of rollers in a staggered arrangement allows the application of the pressure to both surfaces of the sheet material in a sequential manner. Optionally, a third element may be present to deflect the sheet material back to the original plane so that the sheet material enters and exists the void mitigation/elimination apparatus on generally the same plane.

The elements imposing the force or pressure on the sheet materials may be present in the heating section of the apparatus, indeed, they may be or be a part of the heating apparatus or they may be located immediately following the heating apparatus or both. For example, one or more of the staggered elements which create the serpentine motion of the sheet material may be a heated roller which heats the sheet material as its passes through the rollers, Most preferably, except perhaps where one of the rollers is a heated roller, the elements or components that impose the pressure or force on the heater sheet material are positioned such that they act upon the heated sheet material as it is exiting the heating section.

Optionally, though preferably the void mitigation/elimination apparatus further comprises a cooling section containing or comprising one or more cooling elements or means. The cooling section will comprise components or elements similar to the heating elements except that they cool rather than heat. Indeed, cooling may be achieved may be by way of conduction using cooled or cooling rollers, guides and like elements. With respect to radiant cooling, one may have a cooling chamber or hood where coolant lines cool the chamber or hood air. Alternatively, there may be forced cool air which is in the form of a cool air curtain, much like the hot air curtain referenced above, which is expressed onto the surface(s) of the sheet material.

The cooling section may be a part of the void mitigation/elimination apparatus or it may be a separate apparatus that acts upon the prepreg material subsequent to the void mitigation/elimination apparatus. With respect to the latter, the two may be side-by-side or separated by a small distance. Alternatively, especially if a subsequent process is to be performed on the prepreg sheet material that may benefit from the warmed matrix resin, the cooling section may be located along the processing path subsequent to that subsequent process. This is especially beneficial where the prepreg material is to be slit such that the cooling section follows the slitter. In the case where the matrix resin is tacky, on may have two cooling stations: one before the slitter to cool the resin sufficiently to remove the tackiness, and a second following the slitter to bring the temperature of thee slit tape down before winding.

The void mitigation/elimination apparatus may be incorporated into the production line/apparatus for the OEM production of prepreg sheet materials at a point where the matrix resin has commenced firming up, preferably at least 2° C., more preferably least 5° C., most preferably at least 10° C., below the activation temperature of the matrix composition, or, most preferably, following its initial cool down and before its winding or other subsequent processing. If such production process also slits the prepreg sheet into stock widths, the apparatus may be incorporated prior to the slitting or after slitting, but prior to the winding: preferably the former from a capital, and footprint standpoint and to avoid the aforementioned problems with slitting with voids present. Alternatively, the apparatus may be integrated into a dedicated wind/unwind apparatus at a point intermediate the feed roll and the take-up roll or into a multi-purpose unwind/wind apparatus where another function or process is applied to the unwound sheet material, e.g., an apparatus which also removes the original backing or carrier material and replaces it with a polymer liner or carrier. Finally, it may be integrated into an apparatus for the production of slit tape where the void mitigation/elimination apparatus is inserted intermediate the unwind station and the slitting station. In the case of such apparatus including a splicing station, the void mitigation/elimination apparatus may be integrated either prior to or after the splicing station. Preferably, it is integrated prior to as it eliminates voids and poor wetting that may interfere with or result in lesser quality splice and enhances the slitting ability of the resin, like warming butter, to speed up splicing. It also avoids concern that the heating of a splice may adversely affect or, at least temporarily, weaken the splice.

Each of these prepreg processing apparatus incorporating the void mitigation/elimination apparatus presents an improved version of such apparatus as well as a new apparatus in their own respect.

Having described the general features and elements of the apparatus and methods according to the present teaching, attention is now drawn to the following paragraphs and the appended figures wherein exemplary, specific embodiments are described and depicted. In each of the figures, movement or advancement of the prepreg sheet material from the master rolls or stock rolls through the apparatus is left to right.

Figure 2:
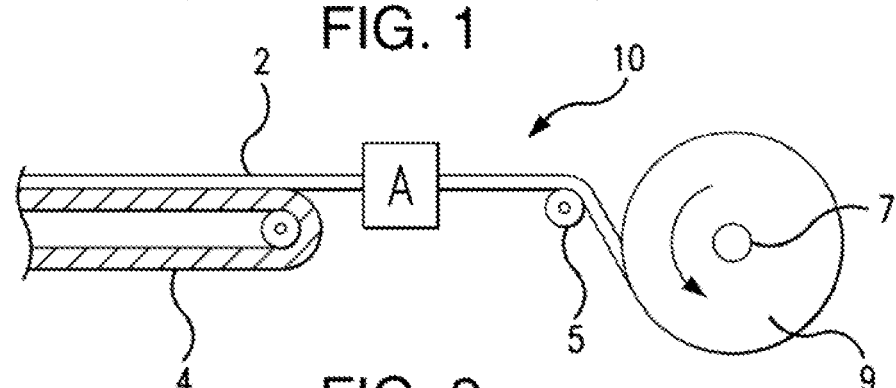
FIG. 2 is a schematic view of a portion of a prepreg manufacturing process integrating the method and apparatus of the present disclosure prior to winding the newly formed prepreg sheet material.

FIGS. 1 and 2 depict alternate schematic embodiments of a portion of a prepreg master sheet manufacturing apparatus 1 and 10, respectively, incorporating a void mitigation/elimination component A. As shown in FIG. 1, prepreg master sheet material 2 is advanced on a conveyor 4 from the manufacturing process, not shown, to the void mitigation/elimination apparatus A from which it advances to a second conveyor 4 for subsequent processing and/or use. FIG. 2 represents a similar process and apparatus with the exception that the prepreg master sheet material 2 advances from the void mitigation/elimination apparatus A to a roller or guide element 5 and then to a take-up spool 7 to form a master roll 9 of prepreg sheet material for storage and/or transport for further processing and/or use.

Figure 3:
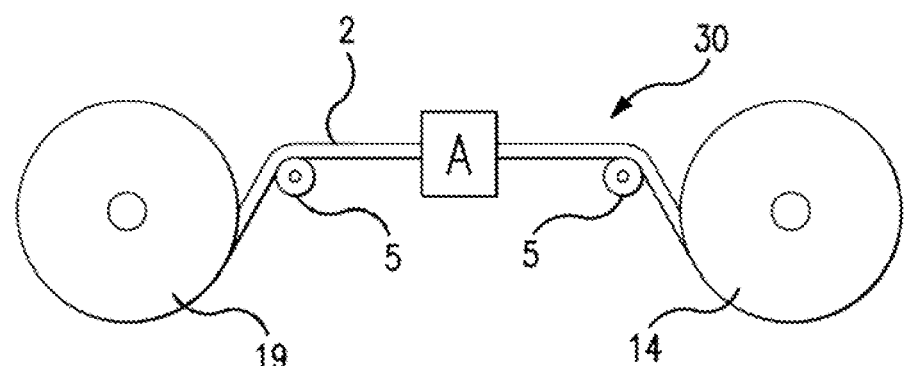
FIG. 3 is a schematic view of an apparatus for subjecting master rolls of prepreg sheet material to the method of the present disclosure.

FIG. 3 depicts a schematic representation of a conversion apparatus 30 for eliminating voids and/or enhancing wetting in a prepreg sheet material 2. Here, a master roll 19 of prepreg sheet material is unwound and advanced through a void mitigation/elimination apparatus A before being rewound to form master rolls of the converted prepreg sheet material 14 for subsequent storage and/or use. As shown, the master sheet material advances along a plurality of roller or guide elements 5

Figure 4:
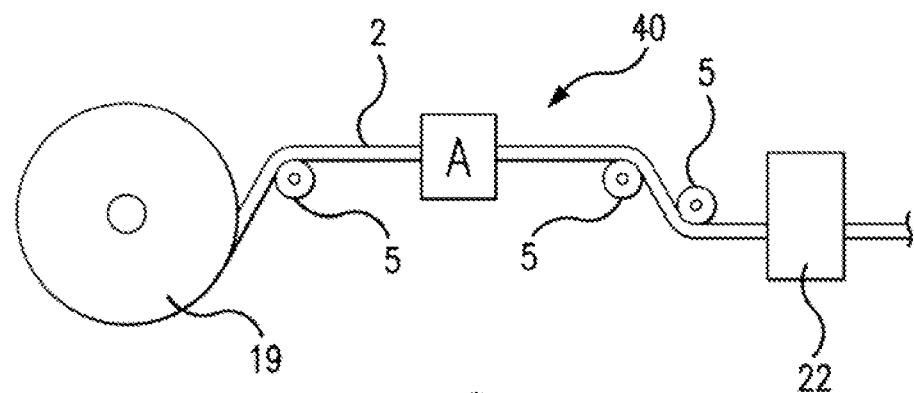
FIG. 4 is a schematic view of an apparatus for subjecting master rolls of prepreg sheet material to the method of the present disclosure prior to further processing.

FIG. 4 is a schematic representation of an apparatus 40 for the processing and/or use of prepreg material 2 which incorporates a void mitigation/elimination apparatus A point prior to any components or apparatus associated with its subsequent processing and/or use. Similar to the apparatus of FIG. 3, a master roll 19 of prepreg sheet material is unwound and advanced through a void mitigation/elimination apparatus A and thereafter advanced to a processing station 22 before being advanced for further processing and/or use, not shown. Advancement of the sheet material is aided by a plurality of rollers or guides 5. The processing station 22 may be a splicing apparatus, a slitting apparatus, a liner substitution apparatus in which the original liner or carrier is replaced with a polymer liner, a liner removal apparatus, etc., or a combination of any two or more of the foregoing. For example, this apparatus may be incorporated into a prepreg layup apparatus whereby the processing station 22 may remove the liner and slit the sheet material for application to a part or mold.

FIGS. 5 and 6 present schematic representations of two similar apparatus 50 and 60 the production of prepreg slit tape each of which incorporates a void mitigation/elimination apparatus A. In FIG. 5 the void mitigation/elimination apparatus A precedes a splicing station 22; whereas in FIG. 6, the void mitigation/elimination apparatus A follows the splicing station 22. Otherwise, both apparatus and processes are the same. Specifically, prepreg sheet material 2 is unwound from prepreg master rolls 19 and advanced to the void mitigation/elimination apparatus A and splicing station 22 or, conversely, the splicing station 22 and then the void mitigation/elimination apparatus A before, being advanced to a slitter 24 which slits the master sheet material into a plurality of slit, tapes 29 of the same or different widths before being advanced to a plurality of winding stations 28 for spooling and/or transverse winding. The master sheet material as well as the slit tapes are advanced and guided through the apparatus by a plurality of rollers and/or guide elements 5. The specific apparatus shown slits the prepreg master sheet material with the carrier or liner attached. Obviously, this apparatus can be modified to remove the liner prior to or subsequent to slitting with a polymer liner being inserted thereafter, prior to winding. All of such apparatus, absent the void mitigation/elimination apparatus, are well known and widely available.

FIG. 7(A)-(M) depict schematic representations of a number of the various iterations of elements for effecting void mitigation/elimination and/or enhancing wetting in prepreg sheet materials in accordance with the present teaching. Each of these iterations can be inserted as the void mitigation/elimination apparatus A in each of the apparatus presented in the foregoing FIGS. 1-6. While each of FIGS. 7(A)-(M) show the various elements in one or a pair of housings, not labeled, it is to be understood and appreciated that housings are not required though may be beneficial for energy conservation and process cleanliness. For convenience, the following table identifies common elements among the various embodiments.

| Number | Named Element | Exemplary elements |
| --- | --- | --- |
| 2 | prepreg sheet material | master prepreg sheet material, wide prepreg sheet material for slitting |
| 4 | conveyer | conveyor belt, series of rollers, series of bars |
| 5 | rollers | rollers, guide elements |
| 24 | slitter | |
| 51 | heating element | radiant heating element, light element (especially infrared), hot air curtain |
| 52 | heating element | heated roller, ultrasonic horn element |
| 55 | baffle | baffle, shield |
| 58 | pinch rollers | |
| 61, 62 | roller | Rollers or guide elements |
| 63 | straight edge | roller, straight edge, bar, blade |
| 65 | cooling element | radiant cooling element, cooling air curtain |
| 67 | cooling element | cooling roller or guide |

Figure 7A:
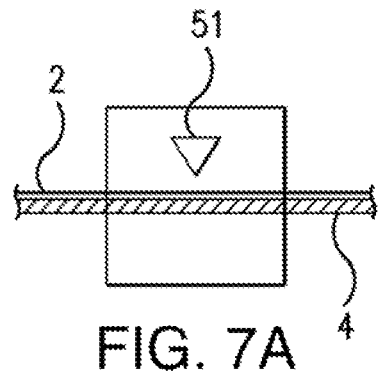
FIG. 7(A)-(M) depict alternate embodiments of the apparatus elements for practicing the method of the present disclosure.
Figure 7B:
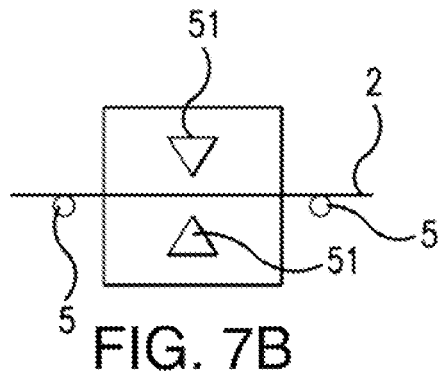
Figure 7C:
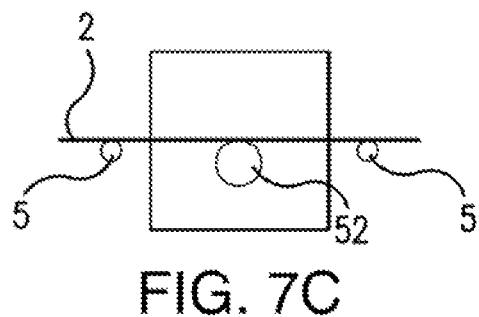
Figure 7D:
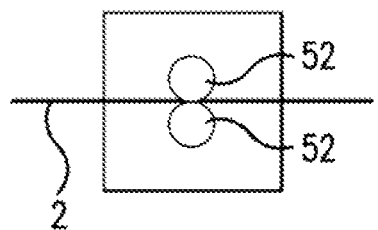
Figure 7E:
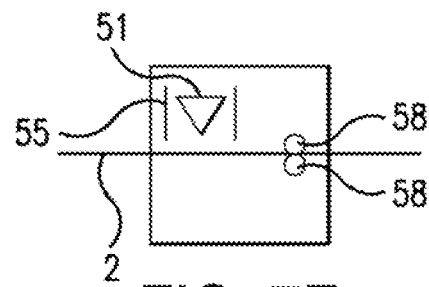
Figure 7F:
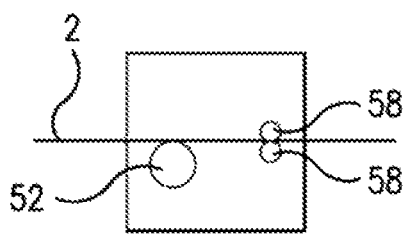
Figure 7G:
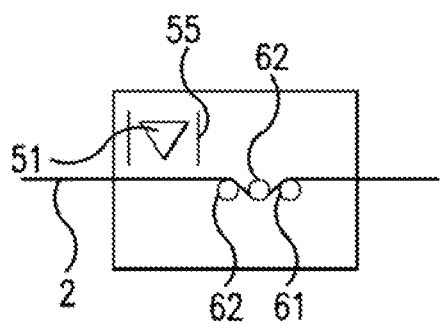
Figure 7H:
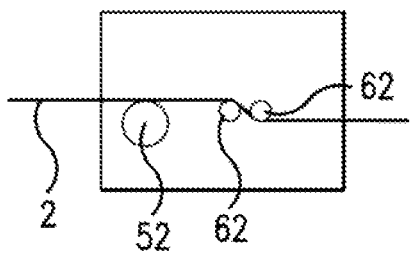

FIG. 7A depicts a simple embodiment of the void mitigation/elimination apparatus wherein a conveyor 24 carries the prepreg sheet material 2 past a heating element 51. FIG. 7B depicts a similar apparatus where the prepreg sheet material 2 supported by a pair of rollers 5 passes between a pair of heating elements 51. FIG. 7C depicts an embodiment where a prepreg sheet material 2 passes over and is in physical contact with a single heating element 52 for direct transfer of heat from the heating element to the prepreg sheet material. FIG. 7D depicts an apparatus similar to the apparatus of FIG. 7C except that the master sheet material passes between a pair of heating elements 52 which may apply a slight pinch to the sheet material as it passes. The apparatus of FIGS. 7E and 7F depict a void mitigation/elimination apparatus wherein prepreg sheet material 2 passes through a pair of pinch rollers 58 after being heated to enhance flow and void elimination/fiber wetting. In the former, heating is accomplished by heating element 51 whose heat is directed and concentrated by baffles 55. In the latter, heating is accomplished by a single heating element 52 in direct contact with the prepreg sheet material. The apparatus of FIGS. 7G and 7H are similar to those of FIGS. 7E and 7F, respectively, with the exception that a plurality of aligned rollers 61, 62 are used instead of the pinch rollers. Here, the force or stress upon the prepreg sheet material as it passes through the aligned rollers promotes flow and movement of the resin, thereby eliminating voids and/or enhancing wetting of the fibers of the prepreg material. As an option, in FIG. 7G, roller 61 may be a cooling roller to enhance or expedite cooling of the heated prepreg sheet material.

Figure 7I:
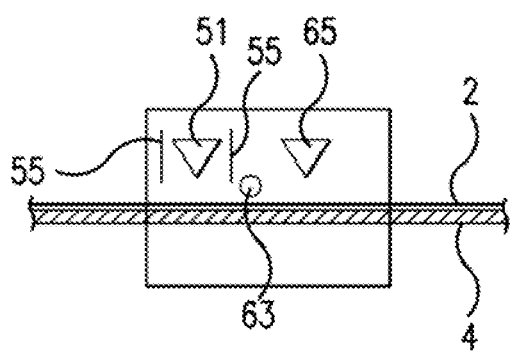
Figure 7J:
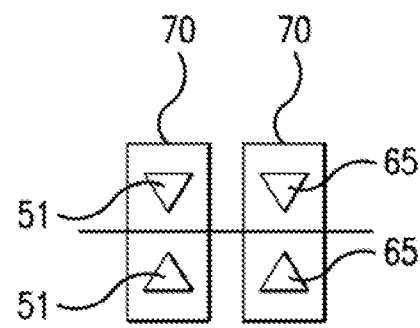
Figure 7K:
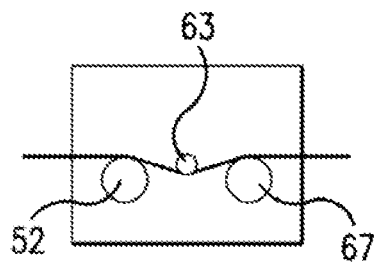
Figure 7L:
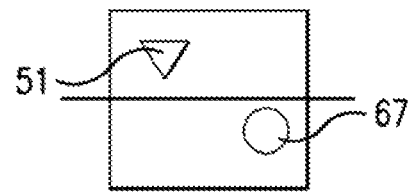
Figure 7M:
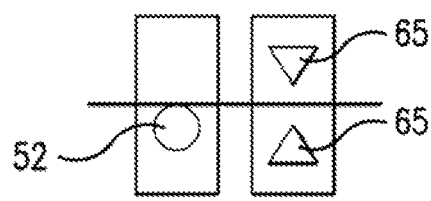

FIGS. 7I through 7M depict a void mitigation/elimination apparatus which incorporates both heating capability and cooling capability. FIG. 7I depicts an embodiment where a conveyor 24 advances a prepreg sheet material 2 past a heating element 51, whose heat is concentrated by baffles 55, a straight edge 63, which applies a touch or slight pressure to the surface of the prepreg sheet material to enhance flow, and a cooling element 65. FIG. 7J depicts an apparatus wherein the prepreg sheet material 2 is advanced between a pair of opposing heating elements 51 and a pair of opposing cooling elements 65: each pair having its own housing 70. The apparatus of FIG. 7K employs a heating element 52 and a cooling element 67, both of which are in direct contact with the prepreg sheet material as it passes the elements, thereby directly transferring heat and cooling, respectively. Intermediate the heating element in the cooling element is a roller or straight edge 63 for enhancing flow of the heated resin. Finally, the apparatus of FIGS. 7L and 7M depict opposite embodiments with a radiant-type heating element 51 and a contact—type cooling element 67 in the former and a contact-type heating element 52 and a radiant-type cooling element 65 in the latter.

Obviously, a number of alternative iterations and embodiments are possible employing all or some of the aforementioned elements so long as at least one heating element is used. As shown, conveyors may be employed for carrying the prepreg sheet, material through the void mitigation/elimination apparatus A, or the prepreg sheet material may be supported by a plurality of rollers and/or guide elements. Those skilled in the having the benefit of the present teaching will readily recognize such alternative iterations for achieving the results of the present teachings.

Although the method and apparatus of the present specification have been described with respect to specific embodiments and figures, it should be appreciated that the present teachings are not limited thereto and other embodiments utilizing the concepts expressed herein are intended and contemplated without departing from the scope of the present teaching. Thus, true scope of the present teachings is defined by the claimed elements and any and all modifications, variations, or equivalents that fall within the spirit and scope of the underlying principles set forth herein.

We claim:

1. An apparatus for reducing the presence of voids and/or unwetted fiber tows in prepreg sheet materials comprising fibrous materials impregnated or infused with a thermosetting resin composition matrix and having a length, a width and a thickness said apparatus comprising a) a heating element, which is a conductive heat source or a radiant heat source, b) one or more conveyors for continuously conveying a prepreg sheet material from a source of said prepreg sheet material to and through or past the heating element and to a subsequent processing component or a winding element, the heating element positioned and aligned to heat and, in use, adapted to continuously heat a cross-sectional length of the prepreg sheet material as the prepreg sheet material continuously passes by or through the heating element to a temperature at which the matrix resin i) becomes tacky and is subject to plastic deformation under minimal pressure or force or ii) becomes flowable and, optionally, c) a pressure means adapted to apply pressure or a force to the so heated prepreg sheet material across its width as it continuously passes by or through the pressure means.

2. The apparatus of claim 1 further comprising the pressure means for applying pressure or force to the heated prepreg sheet material across its width as it continuously passes by or through the pressure means to expedite spread or flow of the heated matrix resin, said pressure means integrated into the heating element or positioned immediately following the heating element.

3. The apparatus of claim 1 further comprising a cooling element following the heating element.

4. The apparatus of claim 3 further comprising the pressure means for applying pressure or force to the heated prepreg sheet material across its width as it continuously passes by or through the pressure means to expedite spread or flow of the heated matrix resin as well as a cooling element, the pressure means positioned at the heating element, intermediate the heating element and the cooling element, or at the cooling element.

5. The apparatus of claim 1 further comprising an unwind means for unwinding a prepreg sheet material from a master roll or stock roll of thermosetting prepreg sheet material and a second winding means for rewinding the thermosetting prepreg sheet following the heating treatment.

6. The apparatus of claim 1 wherein the heating element is a radiant heat source.

7. The apparatus of claim 6 wherein the radiant heat source is positioned so as to be at least 2 inches from the surface of the prepreg sheet material as it passes through the void mitigation/elimination component.

8. The apparatus of claim 1 wherein the heating element is a conductive heat source comprising one or more heated rollers.

9. The apparatus of claim 8 wherein the conductive heat source is a set of heated pinch rollers that heat and apply pressure simultaneously as the prepreg sheet material passes through the pinch rollers.

10. The apparatus of claim 1 further comprising the pressure means for applying pressure or a force to the heated prepreg sheet material across its width as it continuously passes by or through the pressure means to expedite spread or flow of the heated matrix resin, the pressure of means positioned immediately following the heating element and comprising one more sheet guides and/or rollers which apply direct pressure to the heated prepreg sheet material.

11. The apparatus of claim 1 further comprising the pressure means for applying pressure or a force to the heated prepreg sheet material across its width as it continuously passes by or through the pressure means to expedite spread or flow of the heated matrix resin, the pressure or force induced by a deflection in the path of the prepreg sheet material caused by one or more sheet guides and/or rollers which change the path of the prepreg sheet material.

12. The apparatus of claim 1 wherein the pressure means is not present.

13. An apparatus for producing slit tapes of thermosetting prepreg sheet materials comprising fibrous materials impregnated or infused with a thermosetting resin composition matrix having a reduced presence of voids and/or unwetted fiber tows, said apparatus comprising 1) an unwinding means for accepting and unwinding a master roll or stock roll of thermosetting prepreg sheet material, 2) a void mitigation/elimination component comprising a) a heating element, which is a conductive heat source or a radiant heat source, positioned and aligned to heat and, in use, adapted to continuously heat a cross-sectional length of the prepreg sheet material as the prepreg sheet material continuously passes by or through the heating element to a temperature at which the matrix resin i) becomes tacky and is subject to plastic deformation under minimal pressure or force or ii) becomes flowable and, optionally, b) a pressure means adapted to apply pressure or a force to the so heated prepreg sheet material across its width as it continuously passes by or through the pressure means 3) a slitter for slitting the prepreg sheet material into slit tapes, 4) a plurality of winding apparatus for individually winding the slit tapes and 5) a plurality of conveyors for continuously conveying the sheet materials along a path from the unwinding means, to and through or past the void mitigation/elimination component, to and through the slitter means and, finally, to the plurality of winding apparatus.

14. The apparatus of claim 13 wherein the void mitigation/elimination component further comprises a) the pressure means for applying a pressure or force to the heated prepreg sheet material as it continuously passes by or through the pressure means following or concurrent with the heating of the prepreg sheet material by the heating element, b) a cooling element following the heating element for cooling the heated prepreg sheet material, or c) both (a) and (b).

15. The apparatus of claim 13 further comprising a splicer for splicing, end-to-end, two continuous sheets of prepreg sheet material, the splicer positioned intermediate the unwinding means and the slitter.

16. The apparatus of claim 13 wherein the heating element is a radiant heat source.

17. The apparatus of claim 16 wherein the radiant heat source is positioned so as to be at least 2 inches from the surface of the prepreg sheet material as it passes through the void mitigation/elimination component.

18. The apparatus of claim 13 wherein the heat source is a conductive heat source comprising one or more heated rollers.

19. The apparatus of claim 18 wherein the heating element is a set of heated pinch rollers that heat and apply pressure simultaneously as the prepreg sheet material passes through the pinch rollers.

20. The apparatus of claim 13 further comprising the pressure means for applying pressure or a force to the heated prepreg sheet material across its width as it continuously passes by or through the pressure means to expedite spread or flow of the heated matrix resin, the pressure means positioned immediately following the heating element and comprising one more sheet guides and/or rollers which apply direct pressure to the sheet material.

21. The apparatus of claim 13 further comprising the pressure means for applying pressure or a force to the heated prepreg sheet material across its width as it continuously passes by or through the pressure means to expedite spread or flow of the heated matrix resin, the pressure or force induced by a deflection in the path of the prepreg caused by one or more sheet guides and/or rollers which change the path of the prepreg sheet material.

22. The apparatus of claim 13 further comprising a cooling element following the heating element.

23. The apparatus of claim 22 further comprising the pressure means for applying pressure or force to the heated prepreg sheet material across its width as it continuously passes by or through the pressure means to expedite spread or flow of the heated matrix resin as well as a cooling element, the pressure means positioned at the heating element, intermediate the heating and the cooling element, or at the cooling element.

24. The apparatus of claim 13 wherein the pressure means is not present.

* * * * *